(12) United States Patent
Jeong et al.

(10) Patent No.: US 7,186,013 B2
(45) Date of Patent: Mar. 6, 2007

(54) LARGE SIZE BACKLIGHT APPARATUS REDUCED IN THICKNESS

(75) Inventors: Young June Jeong, Suwon (KR); Hyung Suk Kim, Suwon (KR); Jung Kyu Park, Seoul (KR); Ho Sik Ahn, Suwon (KR); Young Sam Park, Seoul (KR); Bum Jin Kim, Boochun (KR); Hun Joo Hahm, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 76 days.

(21) Appl. No.: 11/060,286

(22) Filed: Feb. 18, 2005

(65) Prior Publication Data

US 2006/0083021 A1   Apr. 20, 2006

(30) Foreign Application Priority Data

Oct. 20, 2004   (KR) ............... 10-2004-0084121

(51) Int. Cl.
*F21V 8/00* (2006.01)

(52) U.S. Cl. ............... 362/555; 362/560; 362/561; 362/612; 362/613; 362/616

(58) Field of Classification Search ............... 362/555, 362/612, 613, 616, 624, 625, 558, 800, 561, 362/560, 511, 330
See application file for complete search history.

(56) References Cited

U.S. PATENT DOCUMENTS 6,523,966 B1 * 2/2003 Satoh et al. ............... 362/601
6,709,123 B2 * 3/2004 Flohr et al. ............... 362/603

\* cited by examiner

*Primary Examiner*—Sandra O'Shea
*Assistant Examiner*—Sharon Payne
(74) *Attorney, Agent, or Firm*—Lowe Hauptman & Berner, LLP

(57) ABSTRACT

In a backlight apparatus used in an LCD, in which upper and lower reflective plates are installed under upper and lower transparent plates, respectively. The lower transparent plates and the lower reflective plates introduce light generated by lower light sources in upward directions and the upper transparent plate and the upper reflective plates introduce light generated by an upper light source into those areas, which are not lighted by the lower light sources. This can prevent the formation of dark areas above the lower light sources thereby enhancing the overall uniformity of light.

18 Claims, 5 Drawing Sheets

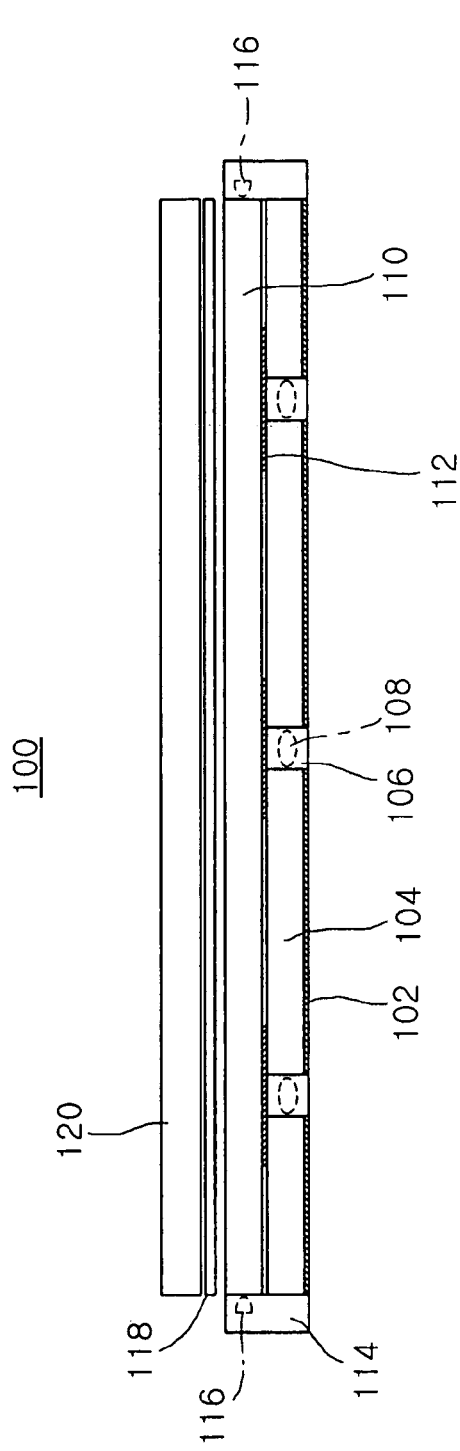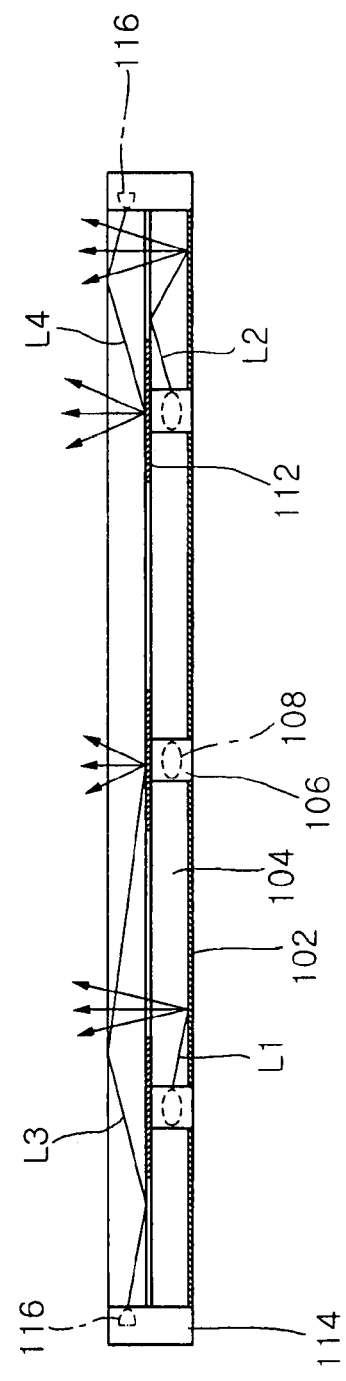

LARGE SIZE BACKLIGHT APPARATUS REDUCED IN THICKNESS

RELATED APPLICATION

The present application is based on, and claims priority from, Korean Application Number 2004-84121, filed Oct. 20, 2004, the disclosure of which is hereby incorporated by reference herein in its entirety.

BACKGROUND OF THE INVENTION

1. Field of the Invention

The present invention relates to a backlight apparatus used in a Liquid Crystal Display (LCD), more particularly, which has upper and lower reflective plates installed under upper and lower transparent plates, respectively, in such a fashion that the lower transparent plates and the lower reflective plates introduce light generated by lower light sources in upward directions and the upper transparent plate and the upper reflective plates introduce light generated by an upper light source into those areas, which are not lighted by the lower light sources, in order to prevent the formation of dark areas above the lower light sources as a problem of a conventional large-sized backlight apparatus, thereby enhancing the overall uniformity of light. In this way, the backlight apparatus of the invention can be designed thin even when applied to a large-sized LCD.

2. Description of the Related Art

LCD backlight apparatuses using Light Emitting Diodes (LEDs) illuminate an LCD panel via direct illumination or side-emitting illumination. In the side-emitting illumination, light from a light source is emitted in lateral directions and then re-directed upward via a reflective plate or a scattering pattern to illuminate the LCD panel. On the contrary, in the direct illumination, light sources are installed under the LCD panel so that light emitted laterally from the light sources are projected upward onto the LCD panel.

FIG. 1 is a schematic cross-sectional view of a conventional side-emitting backlight apparatus. As shown in FIG. 1, the side-emitting backlight apparatus includes a sheet-shaped reflective plate 12 having a scattering pattern 14 formed thereon, a light guide plate 16 placed on the reflective plate 12 and bar type LED light sources 18 and 20 placed at both sides of the light guide plate 16.

The LED light sources 18 and 20 emit light L laterally into the light guide plate 16. Then, light L propagates through the light guide plate 16, and when colliding against the scattering pattern 14, is scattered upward thereby backlighting an LCD panel 22 above the light guide plate 16.

The side-emitting backlight apparatus 10 as above advantageously has a thin and simple structure. Another advantage of this backlight apparatus is that the intensity of light directed upward can be uniformly adjusted through the design of the scattering pattern 14 formed in the top face of the reflective plate 12 or the underside of the light guide plate 16. However, this structure is not applicable to a large-sized LCD since light from the LED light sources 18 and 20 can be sent to a limited distance only.

FIG. 2 is a schematic cross-sectional view of a conventional direct-illumination backlight apparatus. The direct-illumination backlight apparatus 30 includes a sheet-shaped reflective plate 32, a plurality of bar-shaped LED light sources 34 placed on the reflective plate 32, flat light shades 36 placed on the LED light sources 34, respectively, a transparent plate 38 placed above the light shades 36 at a predetermined gap G1 and a diffuser plate 40 placed above the transparent plate 38 at a predetermined gap G2.

The LED light sources 34 emit light L substantially in horizontal directions, and emitted light L is reflected from the reflective plate 32 and passes through the transparent plate 38. Then, light L is diffused by the diffuser plate 40 to a desired uniformity to backlight an LCD panel 44 placed above the diffuser plate 40. The backlight apparatus 30 of this structure has an advantage in that it can effectively backlight a large-sized LCD since the plurality of bar-shaped LED light sources 34 are placed under the LCD panel 42.

However, the backlight apparatus 30 of this structure disadvantageously increases thickness since the gap G1 is required between the LED light sources 34 and the transparent plate 38 and the gap G2 is also required between the transparent plate 38 and the diffuser plate 40.

Describing it in more detail, when generated from the LED light sources 34, light L is reflected upward through first areas A1 and A2 between the light shades 36, such that second areas B1, B2 and B3 screened by the light shades 36 form dark areas and resultant bright lines. In order to remove the dark areas and the bright lines, the gap G2 is required to have at least a predetermined dimension to ensure a sufficient distance between the transparent plate 38 and the diffuser plate 40 so that light beams emitted upward through the first areas A1 and A2 from the transparent plate 38 can mix together before entering the diffuser plate 40.

As described above, since the gaps G1 and G2 are necessarily maintained at predetermined dimensions or more in order to impart uniformity to light directed from the reflective plate 32 toward the LCD panel 42, the direct-illumination backlight apparatus 30 essentially suffers from increase in thickness.

SUMMARY OF THE INVENTION

The present invention has been made to solve the foregoing problems of the prior art and it is therefore an object of the present invention to provide a backlight apparatus used in an LCD, which has upper and lower reflective plates installed under upper and lower transparent plates, respectively, in which a fashion that the lower transparent plates and the lower reflective plates introduce light generated by lower light sources in upward directions and the upper transparent plate and the upper reflective plates introduce light generated by an upper light source into those areas, which are not lighted by the lower light sources, in order to prevent the formation of dark areas above the lower light sources as a problem of a conventional large-sized backlight apparatus, thereby enhancing the overall uniformity of light, by which the backlight apparatus of the invention can be designed thin even when applied to a large-sized LCD.

According to an aspect of the invention for realizing the object, there is provided a backlight apparatus arranged under an LCD panel to illuminate the same, comprising: a lower reflective plate for reflecting incident light upward; a plurality of lower transparent plates placed on the lower reflective plate; a plurality of bar-shaped first light sources having LEDs, the first light sources alternating with the lower transparent plates to emit light generated by the LEDs into the lower transparent plates; an upper transparent plate placed on the lower transparent plates and the lower light sources; a plurality of upper reflective plates spaced from each other at a predetermined interval and placed under the upper transparent plate in positions corresponding to the lower light sources to reflect incident light upward; and a bar-shaped upper light source having LEDs, and arranged at a side of the upper transparent plate to emit light into the transparent plate.

Preferably, each of the upper reflective plates may have a light shade provided in a bottom thereof, wherein the light shade is made of high reflectivity material.

Preferably, the interval of the upper reflective plates may be larger than a width thereof.

Preferably, the upper reflective plates and the upper reflective plates may be stacked in their order on the lower transparent plates and the lower light sources.

In addition, the backlight apparatus of the invention may further comprise light shades placed under the upper reflective plates, respectively, wherein the light shades may comprise a sheet of high reflectivity material.

Preferably, the light shades may closely contact the underside of the upper reflective plates, wherein the light shades, the upper reflective plates and the upper transparent plate may be stacked in their order on the lower transparent plate and the lower light sources.

According to another aspect of the invention for realizing the object, there is provided a backlight apparatus arranged under an LCD panel to illuminate the same, comprising: a lower reflective plate for reflecting incident light upward; a plurality of lower transparent plates placed on the lower reflective plate; a plurality of bar-shaped first light sources having LEDs, the first light sources alternating with the lower transparent plates to emit light generated by the LEDs into the lower transparent plates; an upper transparent plate placed on the lower transparent plates and the lower light sources; a plurality of upper reflective plates spaced from each other to a predetermined gap larger than a width thereof and placed under the upper transparent plate in positions corresponding to the lower light sources to reflect incident light upward; light shades placed under the upper reflective plates and closely contacting the underside of thereof, respectively, the light shade comprising a sheet of high reflectivity material; and a bar-shaped upper light source having LEDs, and arranged at a side of the upper transparent plate to emit light into the transparent plate.

Preferably, the light shades, the upper reflective plates and the upper transparent plate may be stacked in their order on the lower transparent plate and the lower light sources.

Any of the above-described backlight apparatuses may further comprise a diffuser plate placed above the upper transparent plate, wherein the diffuser plate may be stacked on the upper transparent plate.

Preferably, the upper and lower reflective plates may have one selected from the group consisting of an ink dot, a microscopic roughened structure and a Lambertian pattern that is provided in a top surface thereof.

Preferably, the upper and lower light sources each may comprise a plurality of LEDs that are arranged in line.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a front cross-sectional view of the backlight apparatus shown in FIG. 3, which a diffuser plate and an LCD panel are assembled to;

FIG. 6 is a front cross-sectional view illustrating the operation of the backlight apparatus shown in FIG. 3.

DETAILED DESCRIPTION OF THE PREFERRED EMBODIMENT

Preferred embodiments of the present invention will now be described in detail with reference to the accompanying drawings.

Figure 3:
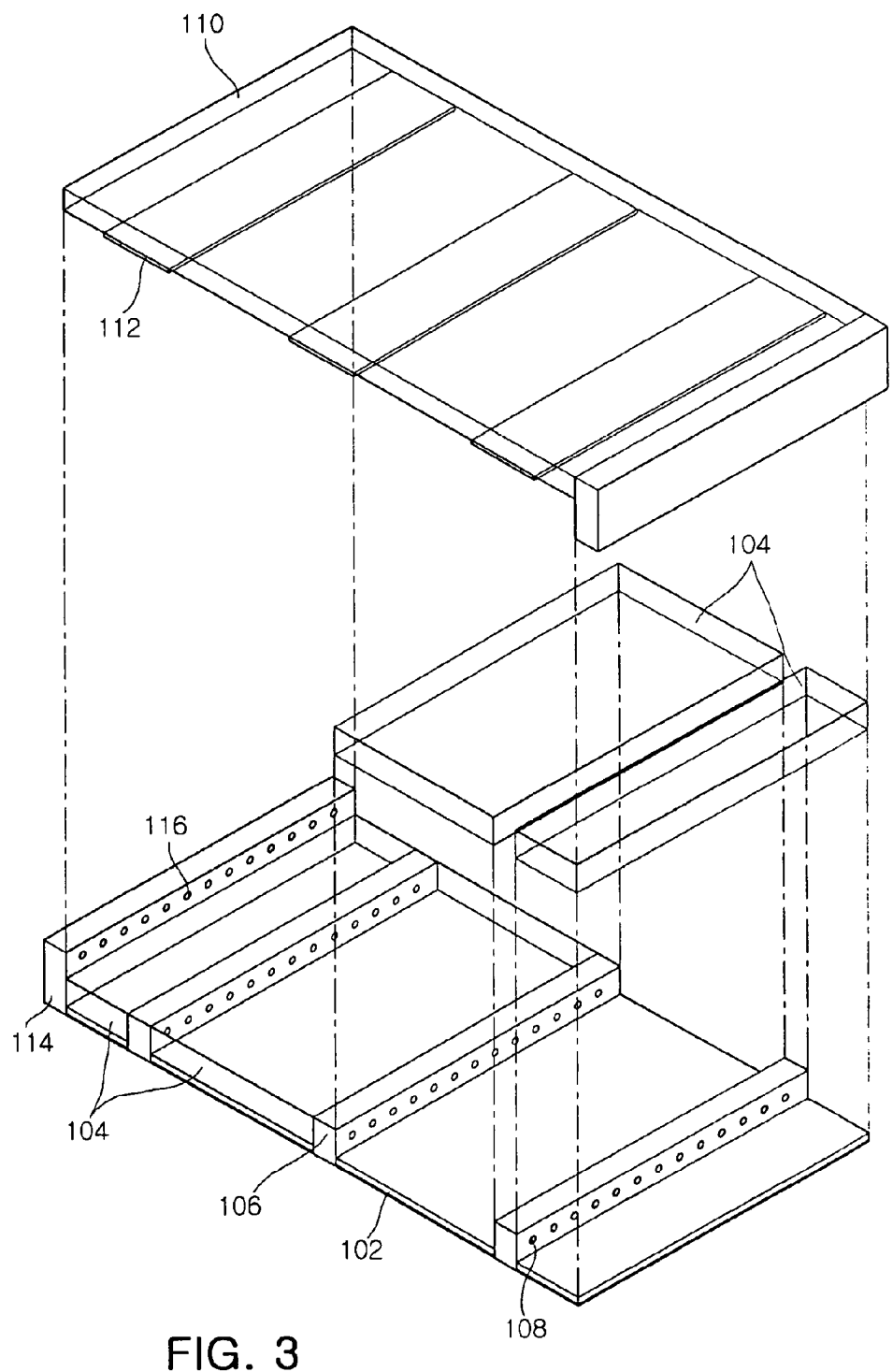
FIG. 3 is an exploded perspective view of a backlight apparatus according to a first embodiment of the invention.
Figure 4:
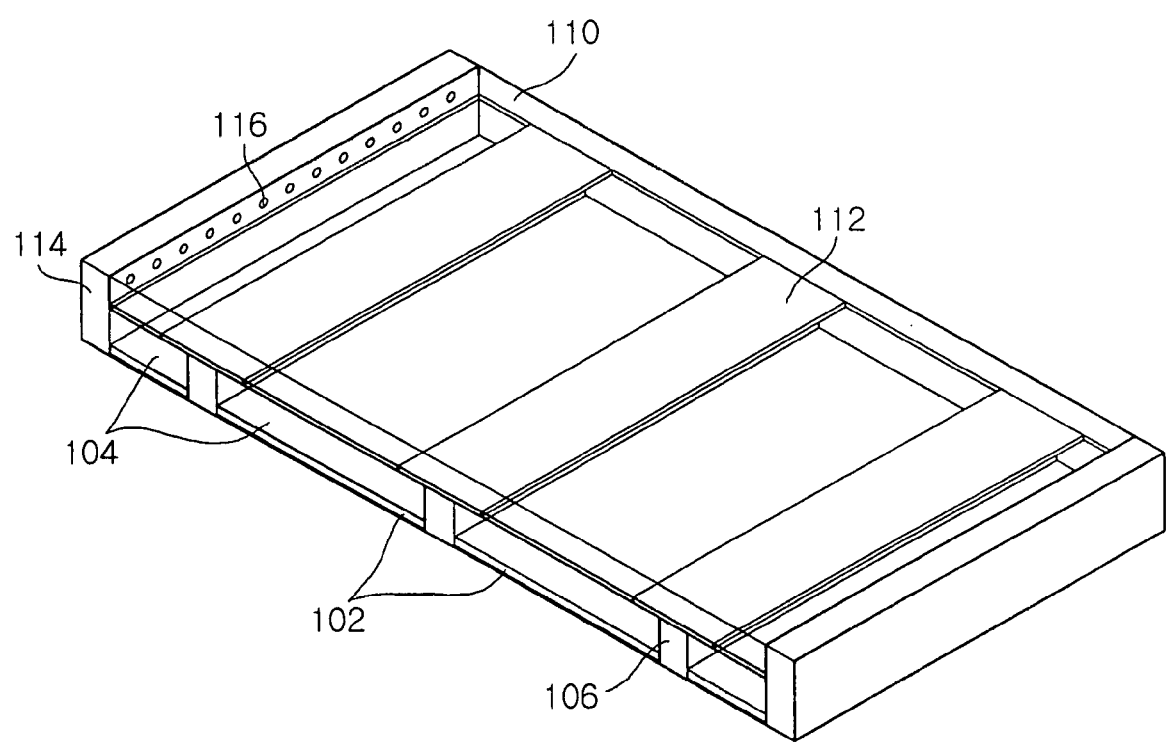
FIG. 4 is a perspective view of the backlight apparatus shown in FIG. 3 in an assembled position.

A backlight apparatus according to a first embodiment of the invention will be described with reference to FIGS. 3 to 5, in which FIG. 3 is an exploded perspective view of a backlight apparatus according to the first embodiment of the invention, FIG. 4 is a perspective view of the backlight apparatus shown in FIG. 3 in an assembled position, and FIG. 5 is a front cross-sectional view of the backlight apparatus shown in FIG. 3, which a diffuser plate and an LCD panel are assembled to.

A backlight apparatus 100 according to the first embodiment of the invention is used for a large-sized LCD, and placed under an LCD panel 120 (FIG. 5) to backlight the same.

The backlight apparatus 100 includes a plurality of lower reflective plates 102 placed generally on a substrate or board (not shown), a plurality of lower transparent plates 104 placed on the lower reflective plates 102, respectively, a plurality of lower LED light sources 106 placed between the lower transparent plates 104, respectively, to emit light into the lower transparent plate 104, an upper transparent plate 110 placed on the lower transparent plate 104 and the lower LED light sources 106, a plurality of upper reflective plates 112 placed on the underside of the upper transparent plate 110 corresponding to the lower LED light sources 106 and a pair of upper LED light sources 114 placed at both sides of the upper transparent plate 110 to emit light into the upper transparent plate 110.

The lower reflective plates 102 are generally placed on the substrate, and shaped as a thin film or sheet. Preferably, the lower reflective plates 102 have a Lambertian surface. Alternatively, the lower reflective plates 102 may have a microscopic scattering pattern such as a micro-prism or a microscopic roughened structure on the surface thereof.

The lower transparent plates 104 comprise a plurality of flat members made of for example transparent acryl or polymethylmethacrylate (PMMA) at a uniform thickness. Each of the lower transparent plates 104 has a surface area the same as that of a corresponding one of the reflective plates 102. Preferably, the lower transparent plates 104, at the underside, closely contact the top surface of the lower reflective plates 102, respectively.

Each of the lower LED light sources 106 has a plurality of LEDs 108 arranged in line, and is adapted to emit light generated by the LEDs 108 in lateral directions. The LEDs 108 each are designed to emit light in both lateral directions (i.e., to the right and left in the drawings) into the lower transparent plates 104 at both sides. Alternatively, a pair of LEDs for emitting light in a single lateral direction may be combined to emit light in both lateral directions. While three of the lower LED light sources 106 have been illustrated in this embodiment, this is an example, but the lower LED light sources 106 may be provided in various numbers such as 2, 4 or more.

In addition, although it has been illustrated that the lower LED light sources 106 are arranged between the lower reflective plates 102, this is an example. For example, a single film or sheet may be provided on a substrate or board (not shown) to form a single lower reflective plate so that the lower transparent plates 104 and the lower LED light sources 106 can be placed on the single lower reflective plate.

Then, the lower transparent plates 104 act as Light Guide Panels (LGPs) so that light emitted from the lower LED light sources 106 can propagate through the lower transparent plates 104, and then reflected upward by the lower reflective plates 102.

The upper transparent plate 110 is a flat member made of transparent material such as acryl or polymethylmethacrylate (PMMA) at a predetermined thickness so as to function as an LGP according to the invention. The upper reflective plates 112 and the upper transparent plate 110 are stacked in their order on the lower transparent plate 104 and the lower light sources 106. Alternatively, the upper reflective plates 112 may be spaced from the top surface of the lower transparent plates 104 and the lower light sources 106 at a predetermined gap.

The upper LED light sources 114 are placed at sides of the upper transparent plate 110. The upper LED light sources 114 each include a plurality of LEDs 116, and are generally arranged at both ends of the upper transparent plate 110 to laterally emit light generated by the LEDs 116 into the upper transparent plate 110. Of course, a single one of the upper LED light sources 114 may be arranged at a longer side of the upper transparent plate 110.

The upper reflective plates 112 are made of a thin member such as a sheet or film, and have a scattering pattern such as an ink dot, a microscopic roughened structure and a Lambertian pattern formed in the top surface thereof and a light shade formed in the underside thereof. Preferably, the light shade may be coated with high reflectivity material. Alternatively, the upper reflective plates 112 may be of dual layers including an upper layer having a scattering pattern or a Lambertian pattern and a lower layer of a light shade.

Accordingly, the upper reflective plates 112 are attached to the top of the lower light sources 106, such that light beams projected toward the upper transparent plate 110 directly from the lower LED light sources 106 can be reflected downward from the upper reflective plates 112 but light beams projected into the upper transparent plate 110 from the upper LED light sources 114 can be reflected upward from the upper reflective plates 112. Preferably, the upper reflective plates 112 are spaced from each other at an interval larger than their widths, so that when light is reflected upward by the reflective plates 102 while propagating through the lower transparent plates 104, light can be effectively introduced into the upper transparent plate 110.

As shown in FIG. 5, a thin diffuser plate 118 is further placed above the transparent plate 110. The diffuser plate 118 is generally made of a film or thin sheet having excellent diffusibility to achieve uniform spatial distribution of light thereby maintaining the entire lightness of the LCD panel 120 uniform as well as to minimize transmission loss.

Figure 1:
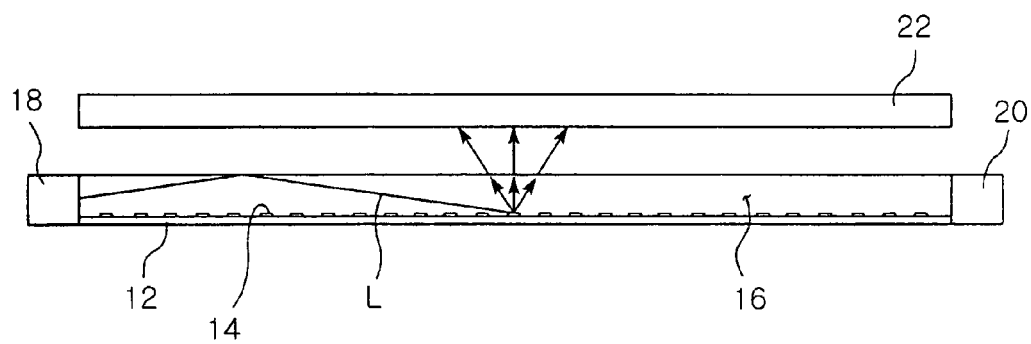
FIG. 1 is a schematic cross-sectional view of a conventional side-emitting backlight apparatus.
Figure 2:
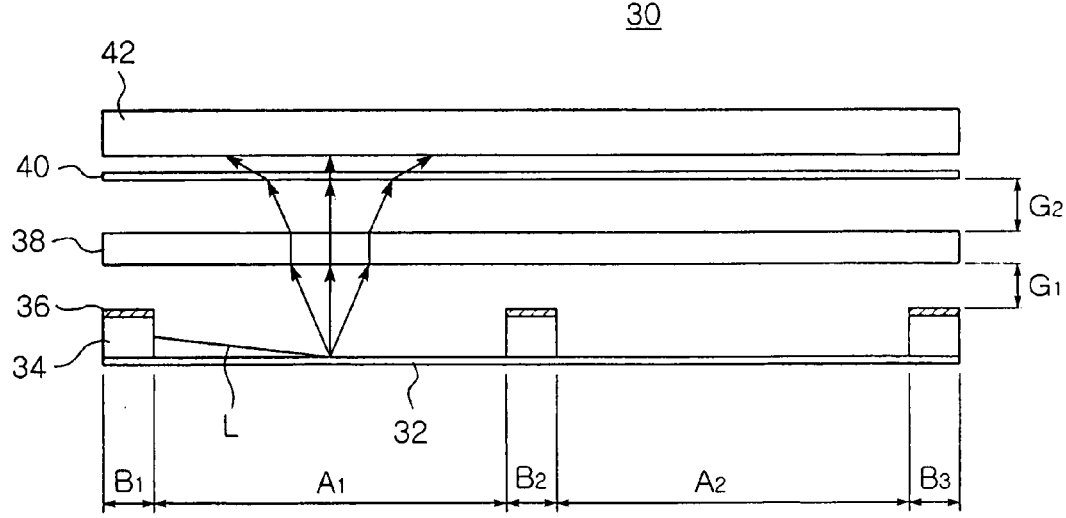
FIG. 2 is a schematic cross-sectional view of a conventional direct-illumination backlight apparatus.

This as a result allows the diffuser plate 118 of the backlight apparatus 100 of the invention to be placed adjacent to or even attached to the upper transparent plate 110 unlike the conventional backlight apparatus as shown in FIG. 2. In this case, light beams reflected from the upper reflective plates 112 brighten specific areas corresponding to the dark areas of the second areas B1, B2 and B3 of the conventional direct illumination backlight apparatus, which have not been lighted by light beams reflected from the lower reflective plates 102, so as to remarkably enhance the entire uniformity of light emitted from the upper transparent plate 110.

Next the operation of the backlight apparatus 100 according to the first embodiment of the invention will be described with reference mainly to FIG. 6 as follows, in which FIG. 3 illustrates the operation of the backlight apparatus shown in FIG.3

As shown in FIG. 6, when the LEDs 108 of the lower LED light sources 106 laterally emit light beams L1 and L2 into the lower transparent plates 104, a light beam L1 is reflected directly by one of the lower reflective plates 102 to enter the upper transparent plate 110. Then, the light beam L1 passes through the upper transparent plate 110 to enter the diffuser plate 118 shown in FIG. 5. Another light beam L2, after being internally reflected from the top surface of one of the lower transparent plates 104, is reflected again upward from a corresponding one of the lower reflective plates 102 to enter the diffuser plate 114 through the upper transparent plate 108. The underside of the upper reflective plates 112 prevents a portion of the light beams from directly entering the upper transparent plates 110 so that the light beams can be incident into the upper transparent plate 110 after being reflected from the lower reflective plates 102.

As the LEDs 116 of the upper LED light sources 114 emit light beams L3 and L4 into the upper transparent plate 110, the light beams L3 and L4 propagate through the upper transparent plate 110 while being reflected from top and bottom surfaces of the transparent plate 110. When reflected upward from the top surface of the upper reflective plates 112, the light beams L3 and L4 are emitted upward from the upper transparent plate 110 to enter the diffuser plate 118 shown in FIG. 5.

As described above, the upper reflective plates 112 are formed in predetermined positions corresponding to the dark areas of the second areas B1 to B3 of the conventional direct illumination backlight apparatus to compensate the second areas B1 to B3 for relatively weak lightness, thereby enhancing the uniformity of light emitted upward from the upper transparent plate 110. As a result, a gap necessary for mixing light emitted from the upper transparent plate 110 is significantly reduced compared to that of the conventional direct illumination backlight apparatus as shown in FIG. 2. This also brings an effect of reducing the entire thickness of the backlight apparatus 100.

Figure 7:
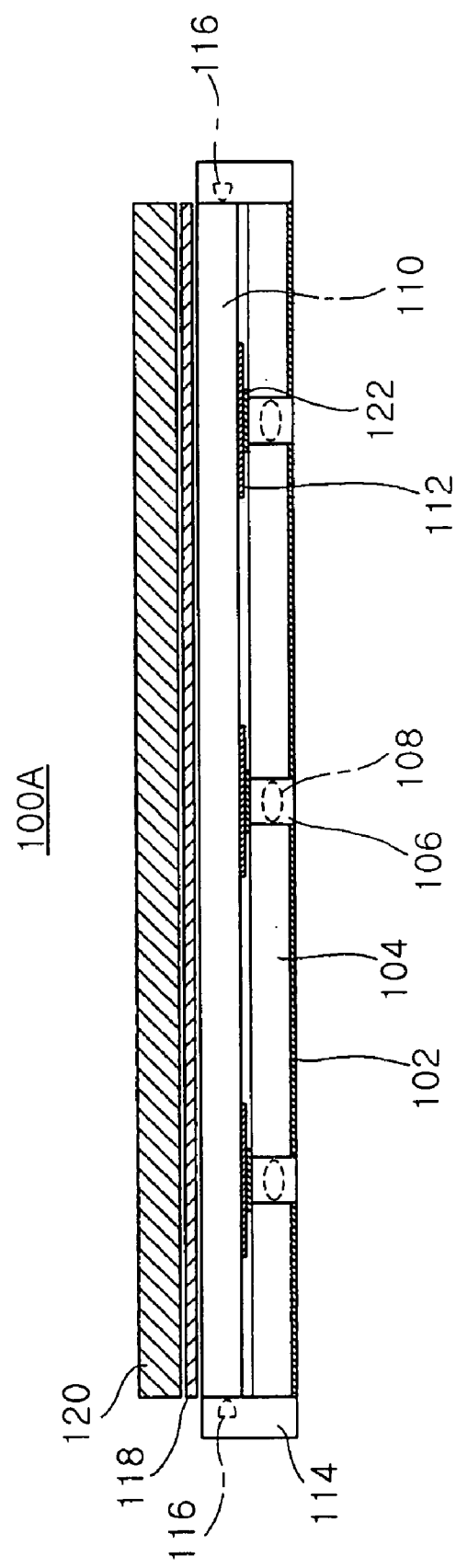
FIG. 7 is a front cross-sectional view of a backlight apparatus according to a second embodiment of the invention.

Next a backlight apparatus according to a second embodiment of the invention will described with reference to FIG. 7. As shown in FIG. 7, the backlight apparatus 100A according to the second embodiment is substantially the same as the afore-described backlight apparatus 100 according to the first embodiment except that light shades 122 are attached to the top of lower LED light sources 106. The light shades 122 are attached to the underside of upper reflective plates 112 corresponding to the top of lower LED light sources 106 in order to reflect light generated by LEDs 108 of the lower LED light sources 106 in downward directions so that light does not directly enters an upper transparent plate 110. The light shades 122 provided as above can prevent the probability of reflective performance restriction or partial light absorption which may take place in the upper reflective plates 112 of the backlight apparatus 100 when they are made of a thin film or sheet.

Preferably, the light shades 122 are shaped as a sheet of high reflectivity material, and have a width smaller than that of the upper reflective plates 122. Of course, the width of the light shades 122 may be determined equal with that of the upper reflective plates 122.

In this way, the light shades 122 closely contact the underside of the upper reflective plates 122, such that the light shades 122, the upper reflective plates 112 and the upper transparent plate 110 are stacked in their order on the lower transparent plates 104 and the lower light sources 106.

In the backlight apparatus 100A of the second embodiment, other components such as lower reflective plates 102, lower LED light sources 106, upper LED light sources 114 and a diffuser plate 118 are the same as those in the afore-described backlight apparatus 100, and therefore they will not described further.

According to the backlight apparatus of the invention, the upper and lower reflective plates are installed under the upper and lower transparent plates, respectively, in such a fashion that the lower transparent plates and the lower reflective plates introduce light generated by the lower light sources in upward directions and the upper transparent plate and the upper reflective plates introduce light generated by the upper light source into those areas, which are not lighted by the lower light sources, in order to prevent the formation of dark areas above the lower light sources as a problem of conventional large-sized backlight apparatuses, thereby enhancing the overall uniformity of light. In this way, the backlight apparatus of the invention can be designed thin even when applied to a large-sized LCD. In addition, the light shades attached to the underside of the upper reflective plates can prevent the probability of reflective performance restriction or partial light absorption which may take place in the upper reflective plates.

While the present invention has been shown and described in connection with the preferred embodiments, it will be apparent to those skilled in the art that modifications and variations can be made without departing from the spirit and scope of the invention as defined by the appended claims.

What is claimed is:

1. A backlight apparatus arranged under a Light Crystal Display (LCD) panel to illuminate the same, comprising:
    a lower reflective plate for reflecting incident light upward;
    a plurality of lower transparent plates placed on the lower reflective plate;
    a plurality of bar-shaped first light sources having Light Emitting Diodes (LEDs), the first light sources alternating with the lower transparent plates to emit light generated by the LEDs into the lower transparent plates;
    an upper transparent plate placed on the lower transparent plates and the lower light sources;
    a plurality of upper reflective plates spaced from each other at a predetermined interval and placed under the upper transparent plate in positions corresponding to the lower light sources to reflect incident light upward; and
    a bar-shaped upper light source having LEDs, and arranged at a side of the upper transparent plate to emit light into the transparent plate.

2. The backlight apparatus according to claim 1, wherein the upper and lower reflective plates have one selected from the group consisting of an ink dot, a microscopic roughened structure and a Lambertian pattern that is provided in a top surface thereof.

3. The backlight apparatus according to claim 1, wherein each of the upper reflective plates has a light shade provided in a bottom thereof.

4. The backlight apparatus according to claim 3, wherein the light shade is made of high reflectivity material.

5. The backlight apparatus according to claim 1, wherein the interval of the upper reflective plates is larger than a width thereof.

6. The backlight apparatus according to claim 1, wherein the upper reflective plates are stacked on the lower transparent plates and the lower light sources, and the upper transparent plate is stacked on the upper reflective plates.

7. The backlight apparatus according to claim 1, further comprising light shades placed under the upper reflective plates, respectively.

8. The backlight apparatus according to claim 7, wherein the light shades comprise a sheet of high reflectivity material.

9. The backlight apparatus according to claim 7, wherein the light shades closely contact the underside of the upper reflective plates.

10. The backlight apparatus according to claim 1, further comprising a diffuser plate placed above the upper transparent plate.

11. The backlight apparatus according to claim 10, wherein the diffuser plate is stacked on the upper transparent plate.

12. The backlight apparatus according to claim 1, wherein the upper and lower light sources each comprise a plurality of LEDs that are arranged in line.

13. A backlight apparatus arranged under a Light Crystal Display (LCD) panel to illuminate the same, comprising:
    a lower reflective plate for reflecting incident light upward;
    a plurality of lower transparent plates placed on the lower reflective plate;
    a plurality of bar-shaped first light sources having Light Emitting Diodes (LEDs), the first light sources alternating with the lower transparent plates to emit light generated by the LEDs into the lower transparent plates;
    an upper transparent plate placed on the lower transparent plates and the lower light sources;
    a plurality of upper reflective plates spaced from each other to a predetermined gap larger than a width thereof and placed under the upper transparent plate in positions corresponding to the lower light sources to reflect incident light upward;
    light shades placed under the upper reflective plates and closely contacting the underside of thereof, respectively, the light shade comprising a sheet of high reflectivity material; and
    a bar-shaped upper light source having LEDs, and arranged at a side of the upper transparent plate to emit light into the transparent plate.

14. The backlight apparatus according to claim 13, wherein the upper and lower reflective plates have one selected from the group consisting of an ink dot, a microscopic roughened structure and a Lambertian pattern that is provided in a top surface thereof.

15. The backlight apparatus according to claim 13, wherein the light shades are stacked on the lower transparent plates and the lower light sources, and the upper transparent plate is stacked on the upper reflective plates.

16. The backlight apparatus according to claim 13, further comprising a diffuser plate placed above the upper transparent plate.

17. The backlight apparatus according to claim 16, wherein the diffuser plate is stacked on the upper transparent plate.

18. The backlight apparatus according to claim 16, wherein the upper and lower light sources each comprise a plurality of LEDs that are arranged in line.

* * * * *